(12) United States Patent
Meier et al.

(10) Patent No.: US 9,560,273 B2
(45) Date of Patent: Jan. 31, 2017

(54) WEARABLE INFORMATION SYSTEM HAVING AT LEAST ONE CAMERA

(71) Applicant: Metaio GmbH, Munich (DE)

(72) Inventors: Peter Meier, Munich (DE); Thomas Severin, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/186,635

(22) Filed: Feb. 21, 2014

(65) Prior Publication Data

US 2015/0244935 A1   Aug. 27, 2015

(51) Int. Cl.
*H04N 5/232*   (2006.01)
*G02B 27/01*   (2006.01)
*G06F 3/01*   (2006.01)

(52) U.S. Cl.
CPC ...... *H04N 5/23241* (2013.01); *G02B 27/0101* (2013.01); *G06F 3/017* (2013.01); *H04N 5/23219* (2013.01); *G02B 2027/0138* (2013.01)

(58) Field of Classification Search
CPC .. G06F 3/017; G02B 27/0172; H04N 5/23241
See application file for complete search history.

(56) References Cited

U.S. PATENT DOCUMENTS

| | | | |
|---|---|---|---|
| 7,302,089 B1* | 11/2007 | Smits | G06F 21/74 382/124 |
| 2009/0262205 A1* | 10/2009 | Smith | 348/211.4 |
| 2010/0199232 A1* | 8/2010 | Mistry et al. | 715/863 |
| 2011/0034176 A1* | 2/2011 | Lord et al. | 455/450 |
| 2012/0249797 A1 | 10/2012 | Haddick | |
| 2013/0229491 A1* | 9/2013 | Kim et al. | 348/46 |
| 2014/0192206 A1* | 7/2014 | Holz | 348/169 |
| 2014/0192259 A1* | 7/2014 | Holz | 348/372 |
| 2014/0368626 A1* | 12/2014 | John Archibald et al. | 348/61 |
| 2014/0368688 A1* | 12/2014 | John Archibald et al. | 348/222.1 |

* cited by examiner

*Primary Examiner* — Nicholas Giles
(74) *Attorney, Agent, or Firm* — Blank Rome LLP

(57) ABSTRACT

The invention is related to a wearable information system having at least one camera, the information system operable to have a low-power mode and a high power mode. The information system is configured such that the high-power mode is activated by a detection of at least one object in at least one field of view of the at least one camera.

19 Claims, 14 Drawing Sheets

Fig. 2: Detection, description and matching of features

Fig. 3: Overall process/system

Fig. 11 Subsystem

Fig. 12 Camera and Display setup

Fig. 13 Possible overall processing system

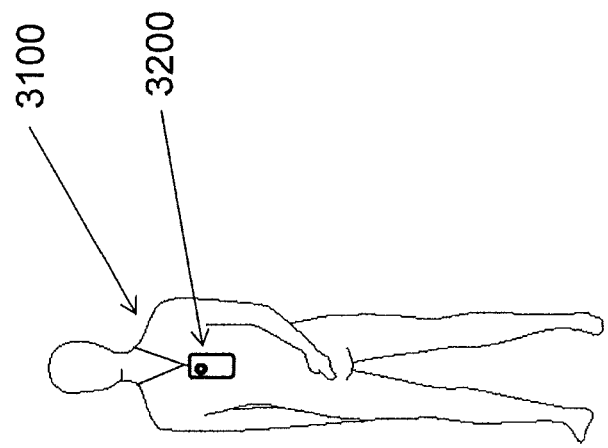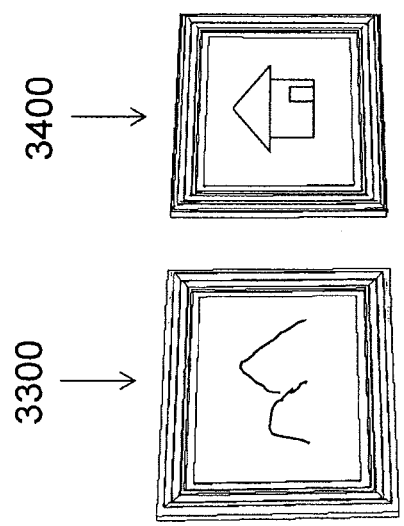
Fig. 14

WEARABLE INFORMATION SYSTEM HAVING AT LEAST ONE CAMERA

BACKGROUND OF THE INVENTION

1. Technical Field

The invention is related to a method and of system capable of providing multimedia information to a user at reduced battery consumption.

2. Background Information

Examples of standard approaches, their limitations and existing solutions are provided below.

Smartphones, Audio Guides and similar information systems have become popular in recent years. Augmented Reality, as a new user interface paradigm, has seen great progress, especially based on computer vision algorithms for object recognition and pose estimation. Head mounted displays, equipped with a camera have been known for some time (e.g. U.S. Pat. No. 7,245,273).

One major obstacle for the true success of ubiquitous information systems, which are able to always watch the user's surrounding for interesting objects, is the high power-consumption of image processing algorithms run on the application processor or the GPU.

The closest state of art we could find to our invention is U.S. Pat. No. 7,302,089. The '089 Patent describes the idea of running a mobile device in low power mode (standby) and high power mode (active). In low power mode, the camera may take a low-resolution image and match it against a known symbol (e.g. the face of the user of the phone or an image). If in the low-resolution image a known symbol is found, the phone may wake up and take a higher resolution image to verify the result and basically unlock the phone in order to take a call or similar things. The goal of the '089 Patent is to enable a power-efficient unlocking, based on images. A scenario might be the phone is laying around and as soon as it receives a call, it tries to check if the user gets in sight in order to unlock the screen.

SUMMARY OF THE INVENTION

What differs in our invention is first of all the purpose and possible applications, in that we are not trying to unlock a device, but we are trying to provide information to the user about objects in the user's surrounding in a power efficient way. The present invention is especially well suited to be used with head mounted displays and a camera pointed at the space in front of the user (e.g., as shown in FIG. 12). A possible scenario could be the user walking through a museum that exhibits 200 images, of which 20 are part of a guided tour. The user starts the guided tour, e.g. as an application on his information system and starts walking through the museum. After a certain time, the system moves to low-power mode. The user can now enjoy hours of walking through the museum, without worrying about his information system's battery. According to the present invention, the information is capable of scanning the user's environment for interesting objects (e.g. interesting pieces in the exhibition). This can be done while consuming little power. As soon as an interesting piece comes into sight, the system can "wake up" and move to a high power mode, for example in order to download interesting content and display it using Augmented Realty or in order to start an audio-clip, explaining the piece.

Another advantage of the invention is improved reaction time for applications, like indoor navigation. The low-power modes allows to wake up the system when it recognizes that new data has to be downloaded or when a new navigation model or a new computer vision model needs to be stored in memory. After preparing everything, the system can move to a low-power mode again. As soon as a waypoint comes into sight, the system can quickly power up and provide the user with relevant information, quickly. The user might also activate the system himself (e.g. when he's lost) and the system can immediately provide navigational information.

Different from the state of the art, aspects of the present method can provide much more sophisticated detections algorithms at low power consumption (e.g., as compared to U.S. Pat. No. 7,302,089. Because aspects of the present invention works on higher level feature descriptors and works on different image resolutions, it can handle much bigger databases of objects and can detect those objects much more reliable. The objects can also be of arbitrary 3D shape.

Many tasks in processing of images taken by a camera, such as in augmented reality applications and computer vision require finding points or features in multiple images of the same object or scene that correspond to the same physical 3D surface. For example, in augmented reality, the main problem is to determine the position and orientation of the camera with respect to the world (i.e., camera pose).

The standard approach to initialization of an optical tracking (i.e. when no knowledge from a previous frame is available) can be divided into three main building blocks: feature detection, feature description, and feature matching (e.g., see FIG. 1). As the skilled person will understand, if knowledge from a previous frame is not available, that does not mean that knowledge from non-optical sensors, like GPS or compass is not allowed. Feature detection is also referred to as feature extraction.

At first, feature detection is performed for identifying features in an image by means of a method that has a high repeatability. In other words, the probability is high that the method will chose the part in an image corresponding to the same physical 3D surface as a feature for different viewpoints, different rotations and/or illumination settings (e.g. local feature descriptors as SIFT (e.g., see Lowe, David G. "Distinctive Image Features from Scale-Invariant Keypoints." *International Journal of Computer Vision* 60.2 (2004): 91-110; hereinafter referred to as "Lowe"), shape descriptors (e.g., see Bosch, A, Andrew Zisserman, and X Munoz. "Representing shape with a spatial pyramid kernel." *Image Processing* 5 (2007): 401-408; referred to hereinafter as "Bosch") or other approaches known to the skilled person). Features are usually extracted in scale space, i.e. at different scales. Therefore, each feature has a repeatable scale in addition to its two-dimensional position. In addition, a repeatable orientation (rotation) is computed from the intensities of the pixels in a region around the feature, e.g. as the dominant direction of intensity gradients.

Next, a feature descriptor is determined in order to enable the comparison and matching of features. Common approaches use the computed scale and orientation of the feature to transform the coordinates of the feature descriptor, which provides invariance to rotation and scale. For instance, the descriptor may be an n-dimensional real-numbered vector, which is constructed by concatenating histograms of functions of local image intensities, such as gradients (as in Lowe). Alternatively, a descriptor might be an n-dimensional binary vector (e.g., as disclosed in Leutenegger, Stefan, *Margarita* Chli, and Roland Y. Siegwart. "BRISK: Binary robust invariant scalable keypoints." Computer Vision (ICCV), 2011 IEEE International Conference on. IEEE, 2011).

Finally, an important task is the feature matching. Given a current feature detected in and described from a current intensity image, the goal is to find a feature that corresponds to the same physical 3D or 2D surface in a set of provided features that will be referred to as reference features. The simplest approach to feature matching is to find the nearest neighbor of the current feature's descriptor by means of exhaustive search and choose the corresponding reference feature as match. More advanced approaches employ spatial data structures in the descriptor domain to speed up matching. Unfortunately, there is no known method that would enable nearest neighbor search in high-dimensional spaces, which is significantly faster than exhaustive search. That is why common approaches use approximate nearest neighbor search instead, e.g. enabled by space partitioning data structures such as kd-trees (See Lowe).

FIG. 1 (in connection with FIG. 2) shows a flow chart of a standard method to match a set of current features with a set of reference features. In step S11, a current image CI is provided taken with a capturing device. The next step S12 then detects and describes features in the current image CI (optional: already selective extraction according to estimated model-feature-positions), where every resulting current feature c has a feature descriptor d(c) and a 2D position in the camera image CI. Possible methods that could be used for feature detection and description are explained in more detail below referring to exemplary implementations. A set of reference features r, each with a descriptor d(r) and optionally a (partial) position and/or orientation in a global coordinate system is provided in step S13. The reference features can be extracted from reference images or 3D models or other information about the object. Please note, that the position and/or orientation in a global coordinate system is optional in case of visual search and classification tasks. In step S14, the current features c from step S12 and the reference features r from step S13 are matched. For example, for every current feature the reference feature is searched that has the closest descriptor to the descriptor of the current feature with respect to a certain distance measure. According to step S15, an application uses the feature matches, e.g. in order to estimate the position and orientation of the capturing device very accurately in an augmented reality application that integrates spatially registered virtual 3D objects into the camera image.

An example of an already proposed solutions includes a visual inertial tracking method disclosed in Bleser, Gabriele, and Didier Stricker. "Advanced tracking through efficient image processing and visual-inertial sensor fusion." *Computers & Graphics* 33.1 (2009): 59-72, that applies inertial sensors to measure the relative movement of the camera from the prior frame to the current frame. This knowledge is used for predicting the position and defining a 2D search space in the image space for features that are tracked from frame to frame. Since the technique uses measurements of relative camera transformations only, it is not suited for the initialization of camera pose tracking or visual search tasks.

Therefore, it would be beneficial to provide a an information system and method of operating the same which enables a higher performance and higher algorithmic flexibility at reduced processing and power requirements while performing visual computing tasks, thus enabling a reduced battery consumption.

Aspects of the present invention are concerned with an information system according to claim 1 and a method of operating an information system.

According to an aspect of the invention, a method of matching image features with reference features comprises the following steps: providing a current image captured by a capturing device, providing reference features, wherein each of the reference features comprises at least one reference feature descriptor, determining current features in the current image and associating with each of the current features at least one respective current feature descriptor, and matching the current features with at least some of the reference features by determining a respective similarity measure between each respective current feature descriptor and each respective reference feature descriptor, the determination of the similarity measure being performed on an integrated circuit by hardwired logic or configurable logic which processes logical functions for determining the similarity measure.

According to the present invention, a new approach is proposed on how visual computing tasks can be optimized and run more robust in real time by implementing dedicated parts in hardware.

A further effect of the invention is to improve the initialization of an optical tracking system based on pre-learned data (e.g., reference features) in order to enable a higher performance at reduced processing and power requirements.

According to another aspect of the invention, there is provided an integrated circuit for matching of image features with reference features, comprising an interface for receiving a number of current feature descriptors of respective current features taken from a current image captured by a capturing device, an interface for receiving a number of reference feature descriptors of respective reference features, and a logic circuit for determining a respective similarity measure between each respective current feature descriptor and each respective reference feature descriptor for matching the current features with the reference features, wherein the logic circuit comprises hardwired logic or configurable logic which processes logical functions for determining the similarity measure.

In a preferred embodiment, our method is implemented on a specialized hardware block and only partially executed by a general purpose processor. The hardware block can of course be part of the same integrated circuit (also referred to as silicon or chip) as the general purpose processor.

In a preferred embodiment, the specialized hardware block is a non-programmable unit, wherein the term "programmable" refers to executing a dynamic sequence of general purpose instructions.

In a preferred embodiment the current image can be an intensity image or a depth image.

When we speak of intensity images throughout this disclosure, we refer to images representing different amounts of light reflected from the environment, mostly depending on the environment's material and the light situation. Intensity images can encode intensity in one channel (e.g. a greyscale channel) or in more than one channel (e.g. in RGB—red-green-blue channels) in different bit resolutions (e.g. 8 bit or high dynamic range).

There are several methods possible to provide a depth image or sparse depth information comprising the depth of an element, e.g. a pixel or a feature, in an image which may be used in a matching process according to the present invention which will be described in the following paragraphs.

According to an embodiment, to determine a depth of at least one element in an intensity image, at least two capturing devices with known relative position and/or orientation each capture a respective intensity image, wherein correspondences are found in the images and the relative position and/or orientation of the capturing devices is used to calculate a depth of at least one element in the intensity images which is part of at least one of the correspondences. In this case the matching process would be conducted in two general steps. First matching features of current frame one and current frame two in order to calculate their depth information from a given pose between capturing device one and two. In a later step, the current features are then matched against reference features, taking advantage of the depth information or derived positional information during the matching process.

According to another embodiment, to determine a depth of at least one element in an intensity image, at least one capturing device captures intensity images at different points of time from different positions, wherein correspondences are found in the different images and a relative position and/or orientation of the capturing device between the different images and a structure of the correspondences are recovered and used to calculate a depth of at least one element in the intensity images which is part of at least one of the correspondences. As in the case above, the matching could again be conducted in several processes, matching recent image features with each other and then incorporating the additional information in a matching process against older reference features.

According to another embodiment, to determine a depth of at least one element in an intensity image, there is provided at least one database of intensity images, wherein for each of the intensity images an overall depth, or depth for at least one image region, or depth for one or more pixels is known and the intensity image captured by the capturing device (current intensity image) is matched against this database. The matching result is used to calculate a depth of at least one element in the current intensity image.

According to another embodiment, to determine a depth of at least one element in an intensity image, there is provided an environment model and information about a position and/or orientation of the capturing device when capturing the intensity image with respect to the environment model (which may be an initial estimation), wherein the environment model and the information about the position and/or orientation of the capturing device are combined and used to calculate a depth or a position estimate of at least one element in the intensity image.

According to another embodiment, to determine a depth of at least one element in an intensity image, there is provided at least one sensor for retrieving depth information or range data and at least a relative position and/or orientation of the at least one sensor with respect to the capturing device, wherein the depth information or range data is used to calculate a depth of at least one element in the intensity image. Preferably, the pose (position and orientation) and intrinsic parameters of, both, the sensor and the capturing device are known.

According to an embodiment, the reference features are extracted from at least one reference image which has been recorded with a second capturing device different from the capturing device. According to an embodiment, the capture time of the at least one reference image is at least one day older than the capture time of the current image.

As a similarity measure according to the present invention, for example, a distance measure may be used. According to an embodiment, the method of the invention may include determining at least one respective check parameter by comparing the distance measure with at least one respective threshold, wherein the check parameter is used as a criterion to determine whether the matching is performed or to influence the distance measure. If the matching is performed, the respective determined similarity measure is used in the matching process.

According to an embodiment of the invention, calculations for determining the respective distance measure, or parts thereof, and a respective check parameter (as explained in more detail below) are performed in parallel in a pipelined manner on the integrated circuit. For example, one respective distance measure and/or check parameter is calculated per clock cycle of a clock signal of the integrated circuit.

In an aspect of the invention, after determining a respective similarity measure, the method further comprises storing a most similar and a second most similar similarity measure from the similarity measures determined until then, and an index of the respective current feature descriptor associated with the most similar similarity measure.

According to an embodiment, the most similar similarity measure is compared with a derivative of the second most similar similarity measure, wherein if this comparison fulfills a predetermined condition, the most similar and second most similar similarity measure, the index, and the associated reference feature descriptor are provided for further processing.

The method may further comprise determining from the computed distance measures a lowest distance measure and storing an index of the respective current feature descriptor for which the lowest distance measure has been determined.

According to an aspect, the method may further include storing the current feature descriptors on a memory (such as SRAM) of the integrated circuit which are retrieved from the memory without wait states.

According to an embodiment, the method further comprises the steps of associating with each of the current features at least one current feature descriptor vector, wherein each of the reference features comprises at least one reference feature descriptor vector, and computing a respective similarity measure between each of the reference feature descriptor vectors of the reference features and each of the current feature descriptor vectors of the current features.

In a possible implementation, at least a pixel of the current image is set as a respective current feature in the current image, i.e. every pixel of an image may represent a feature.

According to an embodiment of the invention, the method is run on different resolutions of the image.

According to an embodiment of the invention, a first feature extraction process may be used to extract a first set of current features and a first set of current feature descriptors is built for the first set of current features, and a second feature extraction process may be used to extract a second set of current features and a second set of current feature descriptors is built for the second set of current features, wherein the first feature extraction process and the second feature extraction process, or a first feature descriptor creation process and a second feature descriptor creation process are different from each other, and the feature matching process of the first and the second set of current feature descriptors are performed by hardwired logic or configurable logic. The matching process of the first and the second set are performed independently from each other ideally by hardwired logic. FIG. 3 shows how the overall process could look like, where 1 . . . n denotes different feature extraction methods, 1 . . . m denotes different feature descriptor processes and the different resulting descriptor sets are matched and object detection takes place. All this can, according to the invention, take place in low-power mode and ideally, in the low-power subsystem.

If a relevant object was detected, a high-power application can automatically be started and offer relevant information to the user. Ideally, this can be an audio-guide or an augmented reality interface, for example as described in Miyashita, T., et al. "An augmented reality museum guide." Proceedings of the 7th IEEE/ACM International Symposium on Mixed and Augmented Reality. IEEE Computer Society, 2008.

In a further aspect, the method may comprise performing geometric verification after feature matching to remove incorrect feature matches or to remove false positives in the case of classification. So in the reference database, many features are stored. Each feature corresponds to a class or pre-learned object. Depending on at least one of the number of matches between the current images features and a pre-learned object's feature and the distance measure of the matches, an object can be assumed to be matched or more than one objects can assumed to be candidates. In both cases, the high-power-mode can be started. Alternatively, in case the low-power subsystem is capable of conduction geometric verification, only after a successful geometric verification of an object, the high-power-mode can be started.

According to an embodiment of the invention, the method may further comprise the step of providing a set of reference features, wherein each of the reference features comprises at least one first parameter which is at least partially indicative of a position and/or orientation of the reference feature with respect to a global coordinate system, wherein the global coordinate system is an earth coordinate system or an object coordinate system, or which is at least partially indicative of a position of the reference feature with respect to an altitude, the step of associating with a respective current feature at least one second parameter which is at least partially indicative of a position and/or orientation of the current feature with respect to the global coordinate system, or which is at least partially indicative of a position of the current feature with respect to an altitude, and the step of matching the current feature with at least one of the reference features of the set of reference features by determining the similarity measure between the at least one first parameter and the at least one second parameter.

For example, the method may include the step of defining a search space with a reduced number of reference features within the set of reference features when matching the respective current feature, wherein the search space is determined based on the at least one second parameter.

According to an embodiment, the method may include the step of considering indicators of the feature extraction process, for example the sign resulting from feature extractor. For example, the sign of a SURF feature corresponds to the sign of the Laplacian of Gaussian during the feature extraction.

According to an embodiment of the invention, in a method for constructing a feature descriptor, feature points are extracted from the image to gain feature points in a 2-dimensional description (parameters a0, a1) and the feature orientation is computed for the extracted feature point using spatial information on the orientation of the capturing device (parameters b0, b1, b2) provided by a tracking system. For example, the tracking system gives the orientation of the capturing device with respect to a world coordinate system as Euler angles and feature descriptors are supposed to be aligned with the gravitational force. A very simple way to gain the orientation for all features is to transform the gravitational force to a coordinate system attached to the capturing device using the Euler angles first and then project it onto the image plane. Thereby, the direction of the gravitational force in the image is computed and used for all features in the image. This technique assumes orthogonal projection which is generally not the case. Incorporating the intrinsic parameters of the camera relaxes this assumption but still all techniques based on 2D images assume everything visible in the image to lie on a plane and therefore are approximations. According to an embodiment of the invention, one or more directions of the at least one feature are computed based on pixel intensities of neighbouring pixels and stored with respect to the common coordinate system. In the matching stage only features with similar directions with respect to the common coordinate system are matched to reduce the number of comparisons needed and decrease the ratio of false matches.

According to an aspect of the invention, at least one of the current feature descriptor or the reference feature descriptor is a higher level description of an object, making it invariant to scale and/or rotation and/or light.

According to embodiments of the invention, the method may also include a method of detecting and describing features from an intensity image which is invariant to scale resulting from the distance between the capturing device and the object, but is sensitive to the real (physical) scale of an object for a variety of applications. It is thus proposed to utilize the depth of an element in the intensity image (e.g. a pixel) for feature detection and/or description at that particular element (pixel) in an intensity image. Thereby, features can be detected and described at real (physical) scale, providing an improved distinctiveness compared to standard scale-invariant feature descriptors on intensity images without introducing any constraints on the camera movement. In one embodiment, the method may comprise the steps of providing an intensity image captured by the camera, providing a method for determining a depth of at least one element in the intensity image, in a feature detection process detecting at least one feature in the intensity image, wherein the feature detection is performed by processing image intensity information of the intensity image at a scale which depends on the depth of at least one element in the intensity image, and providing a feature descriptor of the at least one detected feature.

Measurements of position of the capturing device in a global coordinate system may be provided by a GPS sensor/receiver, IR or RFID triangulation, or by means of localization methods using a broadband or wireless infrastructure. Measurements of orientation of the capturing device in a global coordinate system may be provided by at least one of an inertial sensor, an accelerometer, a gyroscope, a compass, or a mechanical, electromagnetic, acoustic, or optical tracking system. In the context of the invention, an inertial sensor may, e.g. continuously, provide sensor information including the position and/or orientation of an object or device with regard to the environment, by using any combination of the following: magnetometer (e.g. a compass), motion sensor/rotation sensor (accelerometers/gyroscopes), gravity sensor, and other sensors providing such information.

BRIEF DESCRIPTION OF THE DRAWINGS

Embodiments of the invention will be further described with reference to the following Figures, in which:

FIG. 14 shows another possible embodiment of the system.

DETAILED DESCRIPTION OF THE INVENTION

Figure 1:
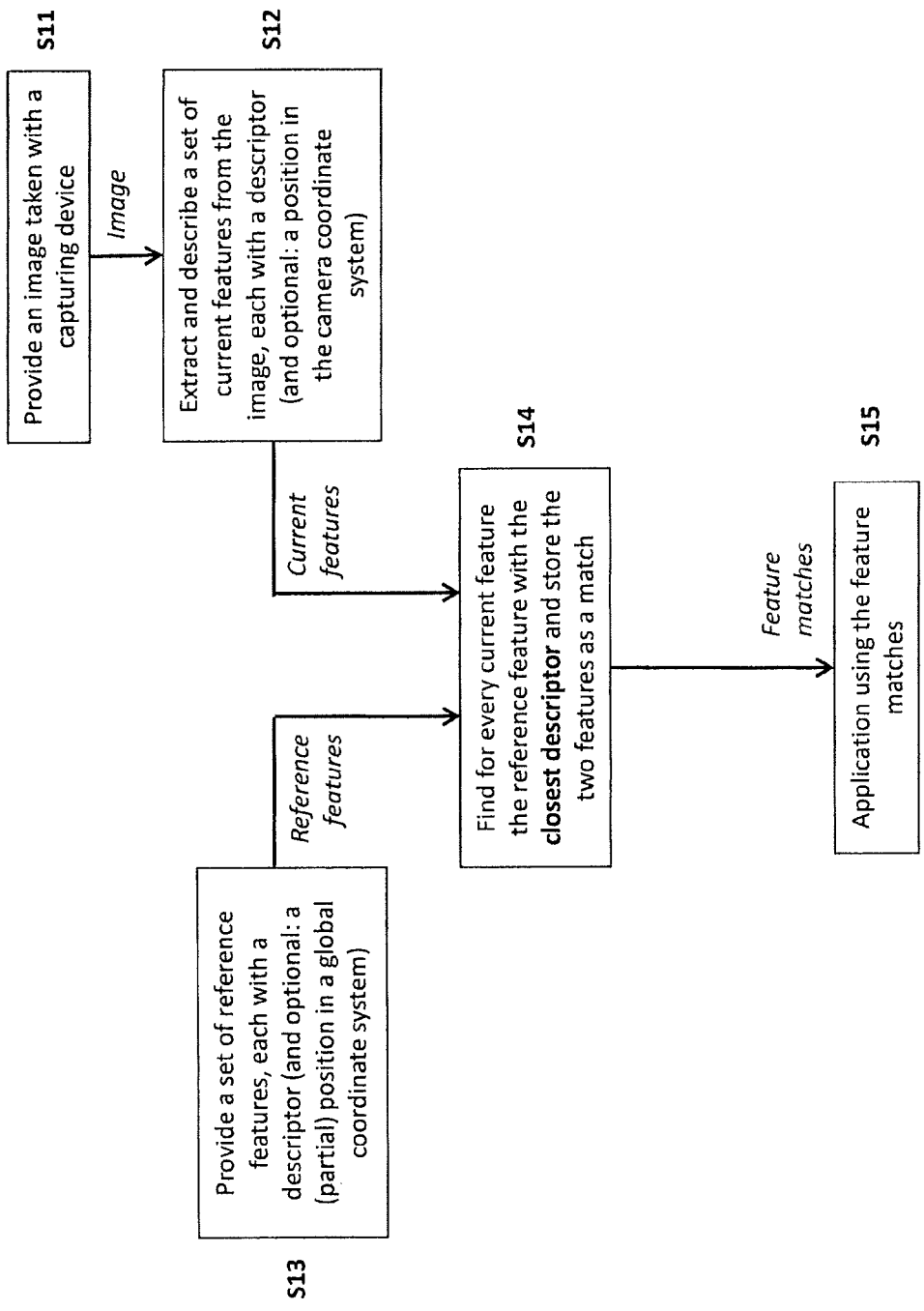
FIG. 1 shows a flow chart of a standard method to match a set of current features with a set of reference features.
Figure 2:
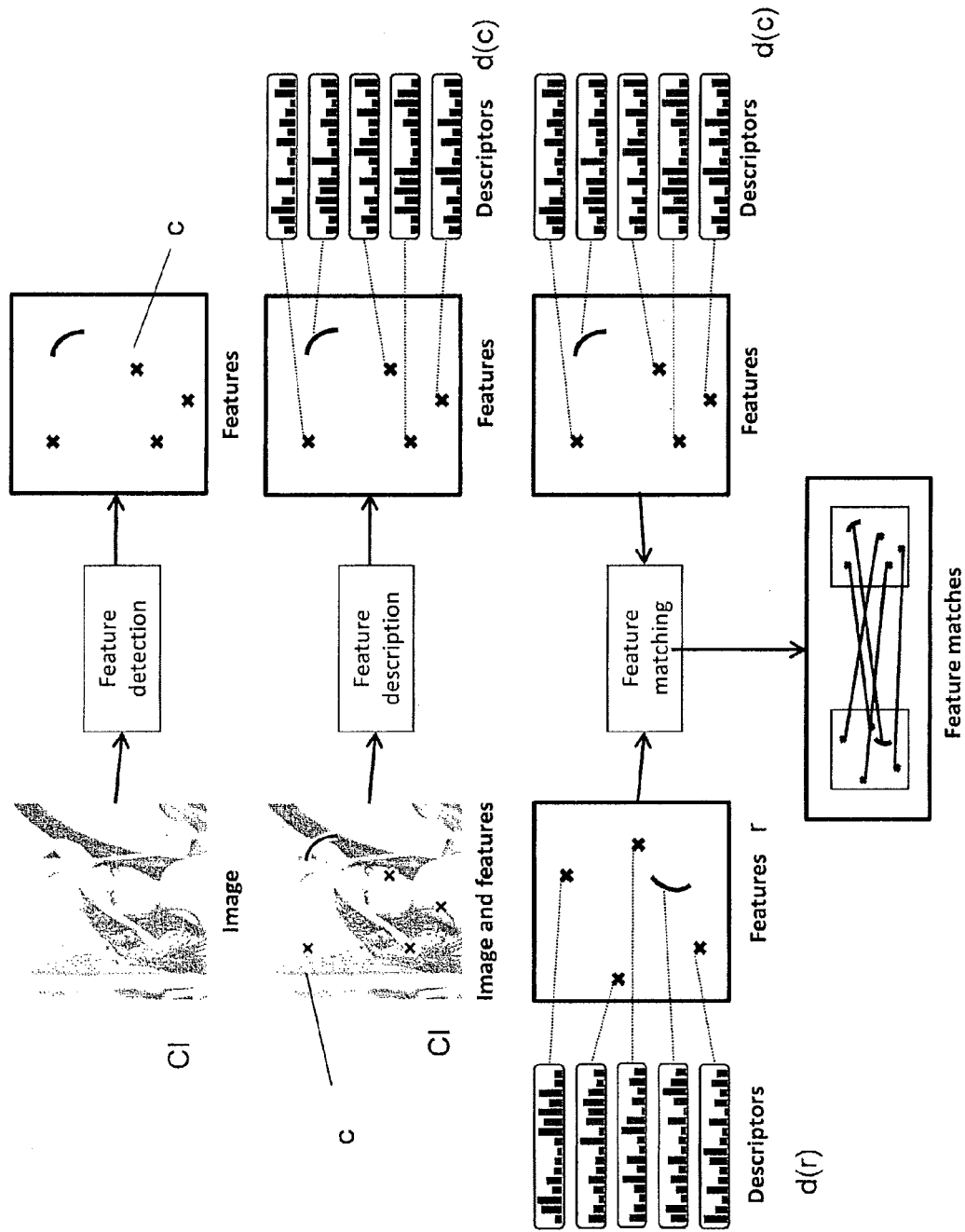
FIG. 2 is a depiction for illustrating detection, description and matching of features in connection with FIG. 1.

An initialization process has been briefly introduced in the beginning and is shown in FIG. 1. Running this process on application processing units, usually requires clock-rates of over 1 GHz. Therefore, today, only short time usage of object detection applications on mobile devices is possible, since the battery is emptied, quickly.

According to preferred embodiments, it is possible to classify objects (visual search process), which is the process of matching a current image with a previously generated class description, or to match individual features (feature matching process), which can then be used, ideally by the application processing unit to run a pose optimization process. Keep in mind that visual search may be based on matching several features per image. At the same time, the whole image might be a feature. Both approaches are supported by the present invention.

Figure 3:
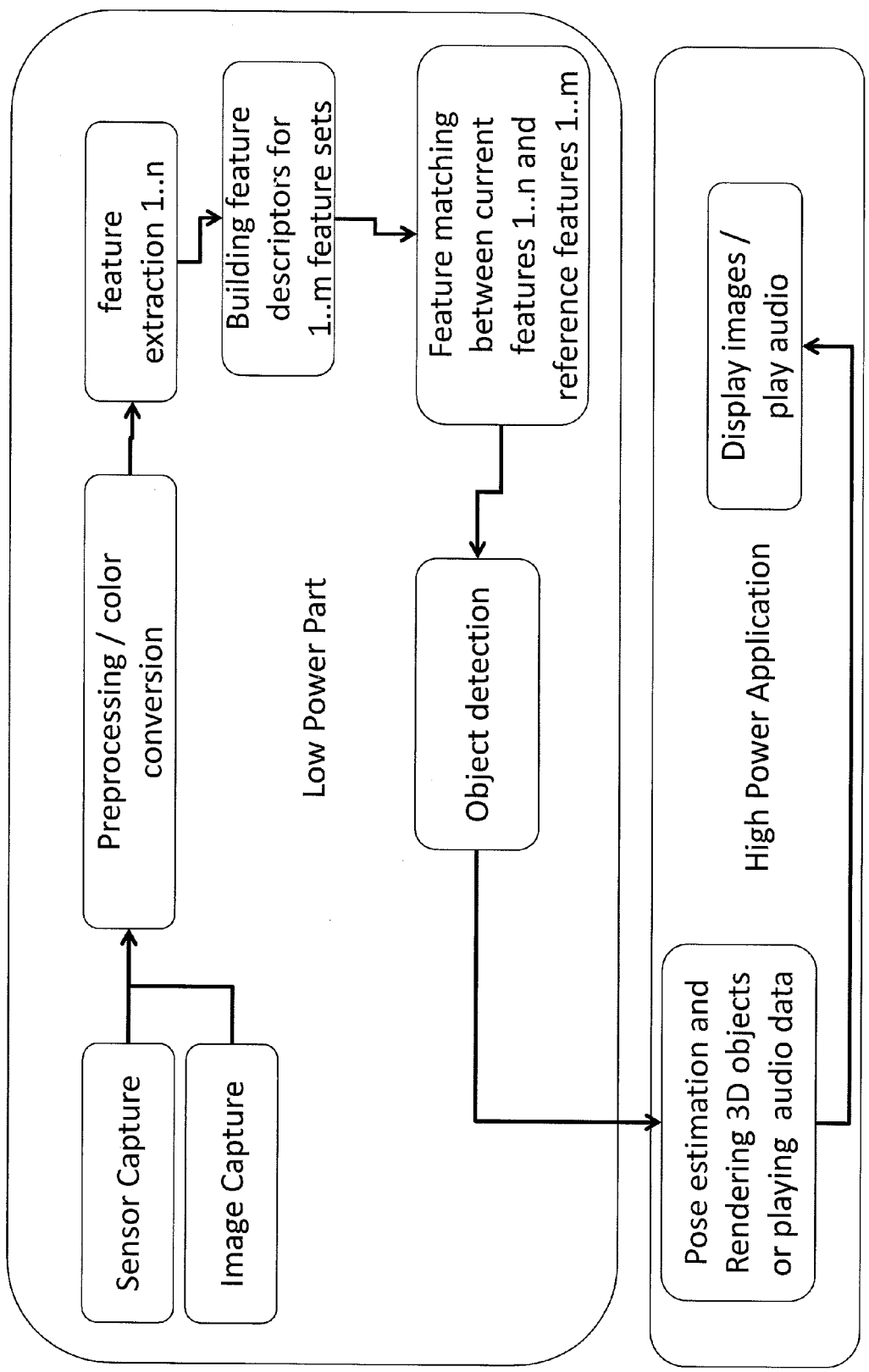
FIG. 3 describes an embodiment of a process of feature matching and a possible application thereof where certain algorithmic building blocks are conducted at low power consumption and other parts are conducted at high power consumption.

According to aspects of the present invention, both the visual search process and the feature matching process can work with different features and feature descriptors present in the database and present in the current image. In that case, the different features are extracted using different feature extraction and/or feature description methods and matched in two independent runs by the hardware unit (as indicated in FIG. 3). For example, first SIFT features are extracted and matched, then SURF features are extracted and matched.

FIG. 3 describes a process of feature matching similarly as described above with reference to FIG. 1 and an application of the matching for pose estimation, rendering 3D objects or playing an audio file. The rendering may take place on a graphic processor unit (GPU).

One advantage of the invention is the possibility to leave out processing steps, which were necessary before or to run them in a completely different advantageous configuration. For example, the feature extraction process can be neglected or left out, creating a very high number of descriptors. Instead, every pixel or a very high number of randomly selected pixels may be chosen as the descriptor center. In this case, each pixel or each of the selected pixels is to be seen as a feature in terms of the present invention. Instead of choosing random pixels, a grid can be used to extract the descriptor centers, for example, every $10^{th}$ pixel of a line, where every $10^{th}$ pixel row is analyzed. The massive increase in features to match (ca. 10.000 features per image) resulted in an increase of successful initializations by 76% on a test-database of several thousand images.

Figure 10:
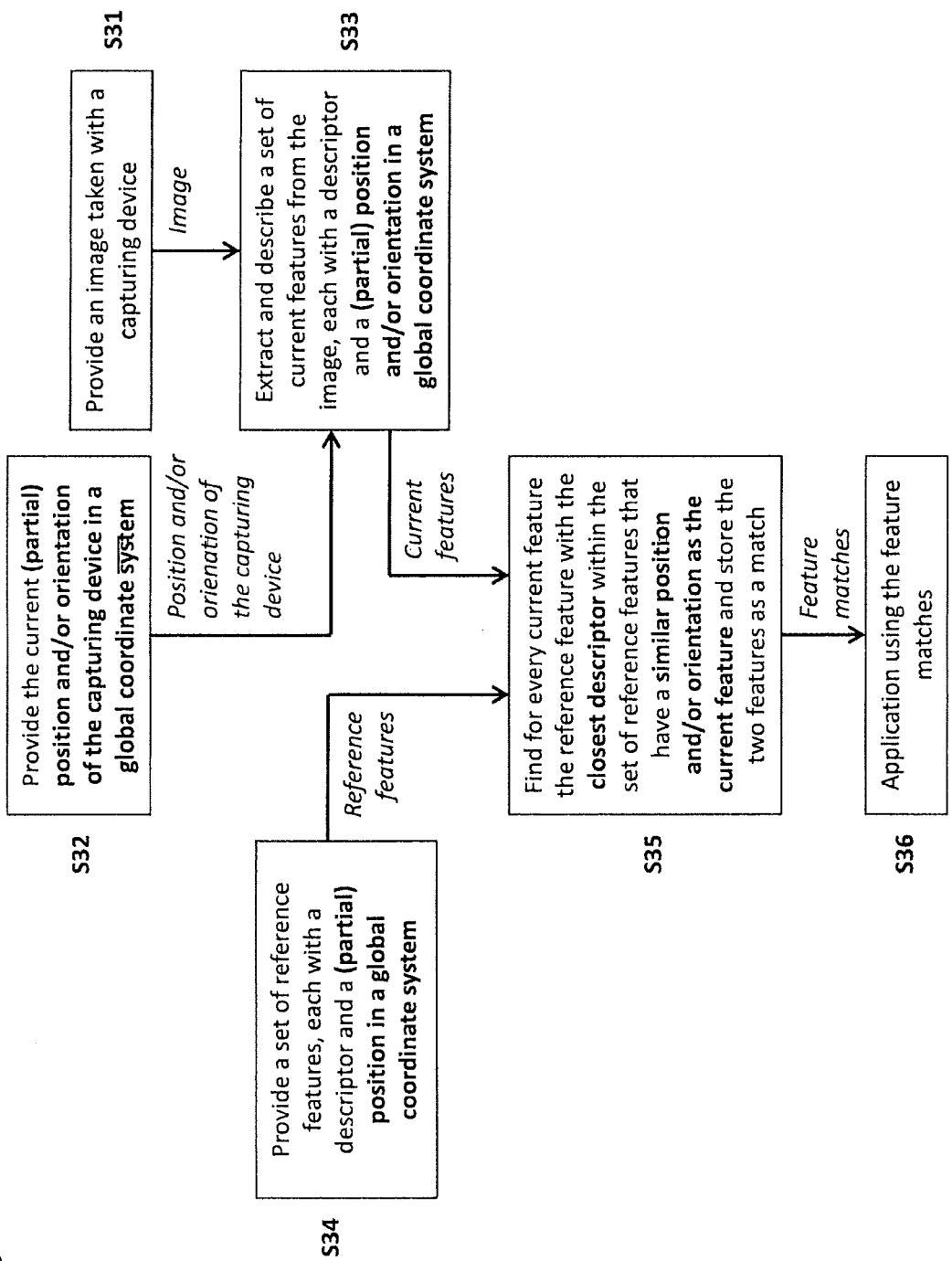
FIG. 10 depicts a flow chart of a method according to another embodiment of the invention where it is checked prior to matching whether a feature may theoretically fit or not.

Advantageously, it may be tested during the process whether a feature pair can theoretically fit or not. This may be achieved by checking the current feature's estimated position against the reference feature's recorded position. According to this aspect of the present invention, it is proposed to narrow the search space or influence the distance measure for matching image features of a current image taken by a capturing device by considering the (partial) knowledge of their position in world coordinates (or global coordinates). A global coordinate system may be an earth coordinate system or an object coordinate system (e.g. a building or a product package or a car), which has a fixed altitude or a fixed orientation related to earth's gravity. As the degrees of freedom of a feature's position that can be determined are heavily depending on the available information on the position and orientation of the capturing device, different exemplary implementations of aspects of the present invention are explained below with respect to FIGS. 4 and 10 in more detail.

It is another aspect of the invention to take indicators of the feature extraction process into account, like the sign resulting from SURF feature extractor (positive or negative Laplacian of Gaussian).

Another aspect of the invention not only takes into account the minimum distance between two feature descriptors, but also the distance between the minimum distance and the second best distance. Particularly, two descriptors are considered as a match, if the second best distance multiplied with a scalar factor smaller than 0.9 is bigger than the best match's distance. This avoids the occurrence of false positives (e.g., wrongly matched features), which will lead to wrong classifications or problems in the pose estimation.

In another aspect of the invention, all current features of the current image are matched against each other, removing features, which are very similar to each other (the distance measure being below a certain threshold). The filtered set of current features is then matched against reference features.

The present invention is well suited for object classification. The present invention is also well suited for camera pose initialization, where no or incomplete prior knowledge about the object's pose in relation to the camera is available.

Feature Detection:

A feature is a salient element in an image which can be a point, a line, a curve, a connected region or any other set of pixels. Also, a pixel, all pixels of an image, or each of a set of selected pixels may be defined as a feature in terms of the present invention.

Feature detection algorithms are usually saliency detectors. For example, they find lines, edges, or local extrema of a differential operator. A feature detector can be seen as a function mapping a region of pixels to a response. In the literature, this region is referred to as sampling window or measurement aperture of the feature detector. The response is eventually thresholded to decide which elements are features and which are not. In order to extract features at a certain scale, either the sampling window can be scaled accordingly or the image is scaled before computing the response of the feature detector. The size of a feature is then defined as the size of the sampling window used to detect it.

Common examples for keypoint detection methods include Laplacian of Gaussian (LoG), Difference of Gaussians (DoG), Determinant of Hessian (DoH), Maximally stable extremal regions (MSER), Harris features, or learning-based corner detectors such as FAST.

3D features also represent a possible data source for this invention. 3D features can be extracted from depth images or 3D models by many methods, for example identifying local extrema.

In one aspect of the invention, the whole image may also be seen as a feature.

In another aspect of the invention, the combination of 3D data and intensity data can be used as input data, as for example described in Wu, Changchang et al. "3D model matching with Viewpoint-Invariant Patches (VIP)." *IEEE Conference on Computer Vision and Pattern Recognition* (2008) 0 (2008): 1-8.

Feature/Image Description:

The visual features extracted (feature points, edges, corners, local extrema, etc.) need to be repeatable which means that their extraction should be possible despite different viewpoints (orientation, scale, etc.), light conditions and/or image noise.

The matching process consists of finding at least one corresponding visual feature which is extracted from two or more images. It often requires the creation of descriptors that allow that the same physical feature in different images is described in a similar way with respect to some similarity or distance measure. An overview and comparison of some feature point descriptors is given in Mikolajczyk, K. and Schmid, C. "A Performance Evaluation of Local Descriptors." 2005 *IEEE Trans. Pattern Anal. Mach. Intell.* 27, 10 (2005): 1615-1630. Once one or multiple descriptors for every extracted feature are created, they are matched according to the similarity or distance measure: to every feature in the query image a match is assigned using nearest descriptor or based on the ratio test of Lowe.

Bosch describes a descriptor that represent local image shape and its spatial layout, together with a spatial pyramid kernel.

Uchiyama, Hideaki, and Marchand, Eric. "Toward Augmenting Everything Detecting and Tracking Geometrical Features on Planar Objects." 2011 *International Symposium on Mixed and Augmented Reality* (2011):17-25 (referred to hereinafter as "Uchiyama") describes a descriptor based on the spatial relationship of features, which is also a possibility. The approach is to select n nearest neighbors of a point X in a set Pn. Select m<n points from Pm. Compute all possible invariants based on f points of m (f=5 for the cross ratio and f=4 for the affine invariant). The sequence of the invariants in a fixed order is one descriptor of the point X. The affine invariant is the ratio between two triangle areas: A(a,c,d)/A(a,b,c). The perspective invariant is the cross ratio of triangle areas: (A(a,b,c)*A(a,d,e))/(A(a,b,d)*A(a,c,e)). In Uchiyama, a hashing process is used to match features, which could be left out, using our engine.

Taati, Babak: "Generation and Optimization of Local Shape Descriptors for Point Matching in 3-D Surfaces." Thesis (Ph.D, Electrical & Computer Engineering)—Queen's University, Kingston, Ontario, Canada, August 2009, as an example, gives a good overview on 3D and depth-image based descriptors for matching.

Overall for this invention, a descriptor can advantageously be a vector, which is derived from a 2D image or a part of a 2D image or 3D data, which is created by not just transforming pixels into a different color space or normalizing their values. In another aspect of the invention, descriptors are derived from histograms, statistics or relative relations on pixel, shape or depth values.

Figure 5:
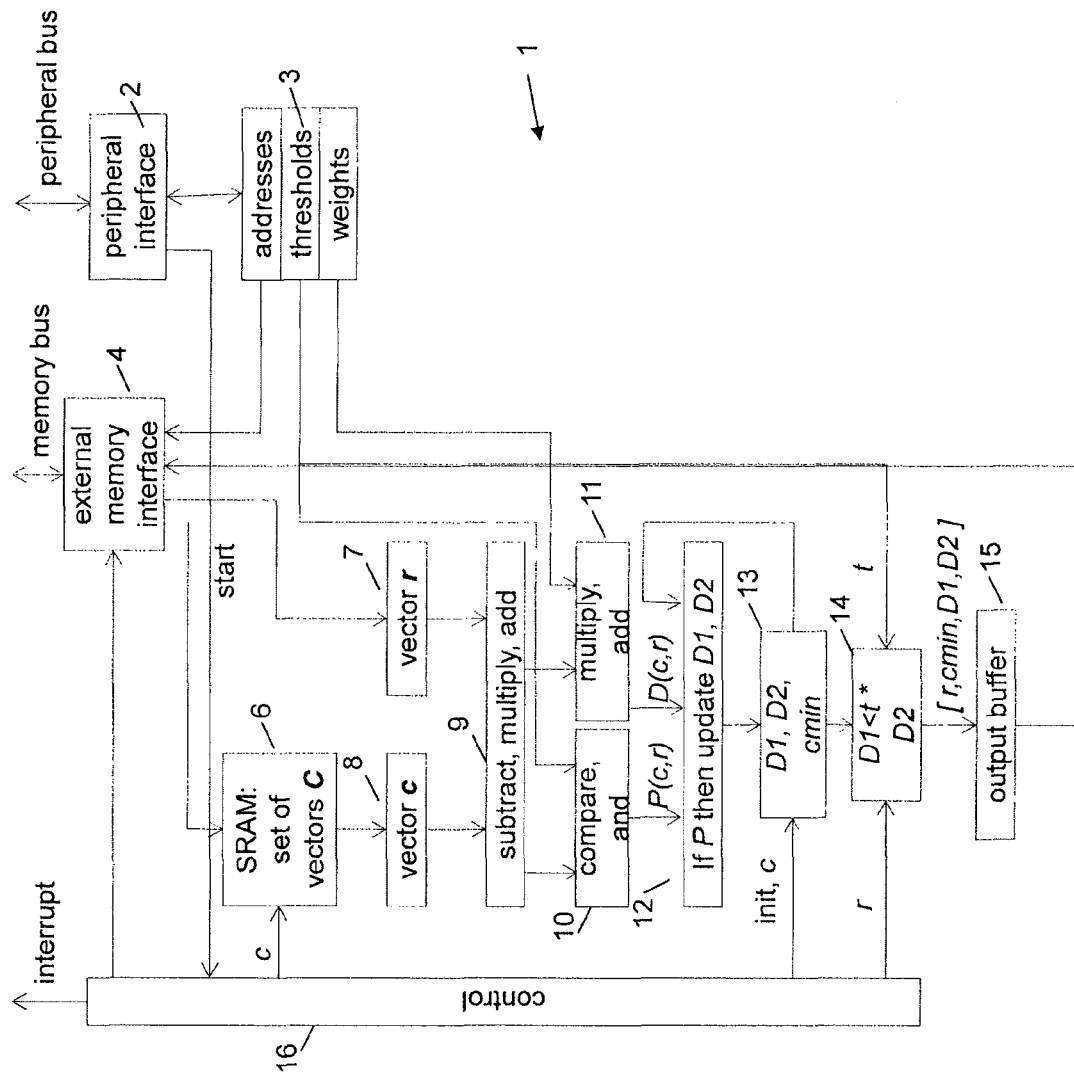
FIG. 5 shows a possible implementation of the determination of a similarity measure in a matching process on an integrated circuit according to an embodiment of the invention.
Figure 7:
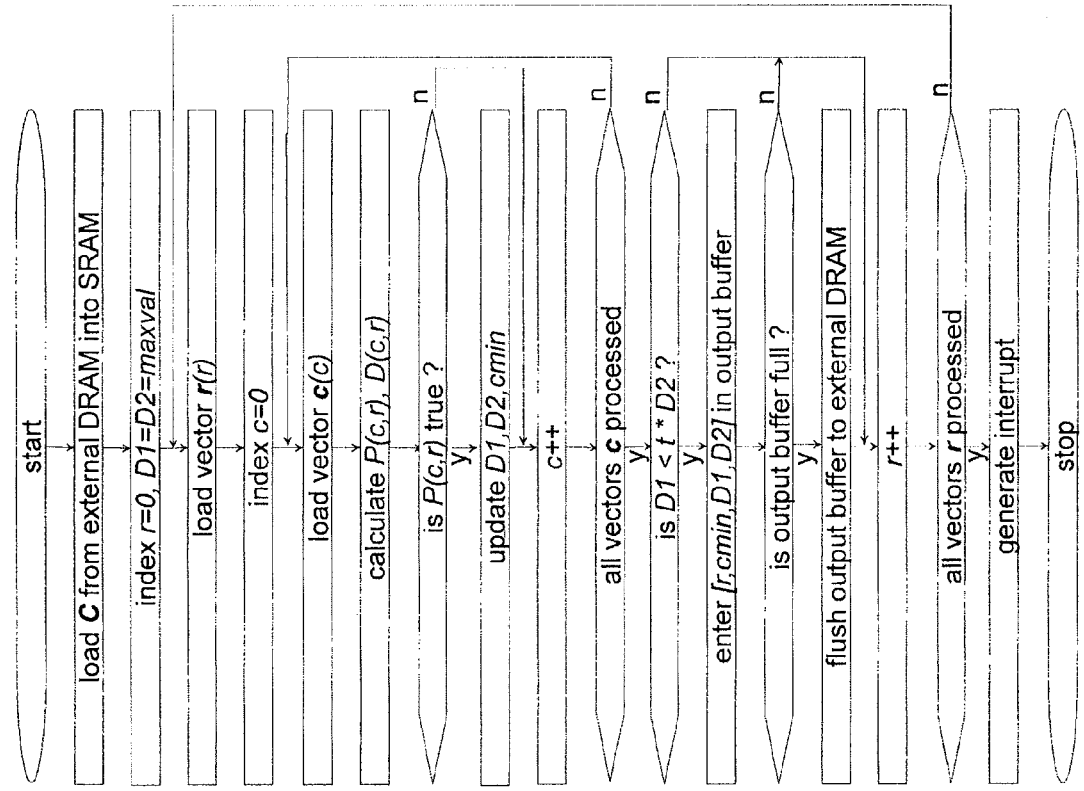
FIG. 7 shows a flow chart of a general workflow of the process as described with reference to FIGS. 5 and 6.

Matching Process:

The matching process is a key building block in the invention's solution. A possible layout according to an embodiment is shown in FIG. 5. A possible process diagram is shown in FIG. 7. According to an embodiment, it combines the following calculations:

As a similarity measure according to the present invention, for example, a distance measure may be used. $D(c, r)$ describes an advantageous distance measure between two descriptors, according to our invention. Particularly, it describes a distance measure between a current feature descriptor $d(c)$ of a current feature c and a reference feature descriptor $d(r)$ of a reference feature r. For example, current features c and reference features r and their feature descriptors $d(c)$ and $d(r)$ are determined and provided, respectively, as described above with respect to FIG. 1.

Generally, a respective distance measure $D(c, r)$ may be determined between one or more properties of the respective current feature c including the respective current feature descriptor $d(c)$ and one or more properties of the respective reference feature r including the respective reference feature descriptor $d(r)$.

The method of the invention may include determining a respective first distance measure $\Delta d$ between each respective current feature descriptor $d(c)$ and each respective reference feature descriptor $d(r)$ for the determination of the similarity measure $D(c, r)$.

According to an embodiment, the method of the invention may include determining a respective second distance measure (here $\Delta x$ and/or $\Delta y$) between position information $x(c)$ and/or $y(c)$ of the respective current feature descriptor $d(c)$ in the current image and the respective position information $x(r)$, $y(r)$ of the respective reference feature descriptor $d(r)$ in a common coordinate system for the determination of the similarity measure $D(c, r)$. For example, this may be computed as the Euclidian distance between the 3D position information $x(c)$ of the respective current feature described by $d(c)$ and the 3D position information $x(r)$ of the respective reference feature described by $d(r)$.

According to a further embodiment, the method of the invention may include determining a respective third distance measure $\Delta z$ indicative of an angle between the position information $z(c)$ of the respective current feature descriptor $d(c)$ in the current image and the position information $z(r)$ of the respective reference feature descriptor $d(r)$ in a common coordinate system for the determination of the similarity measure $D(c, r)$. For example, this may be computed as the scalar product between a first vector $z(c)$ defined by the camera center and the 3D position information of the respective current feature and a second vector $z(r)$ defined by the camera center and of the 3D position information of the respective reference feature.

In another embodiment, $\Delta z$ can be indicative of an angle between the camera orientation in respect to a global coordinate system and an individual directional property of a feature, e.g. derived from the surface normal of a known surface on which the feature is located.

According to a further embodiment, the method of the invention may include determining a respective fourth distance measure (here, $\Delta u$ and/or $\Delta v$) between a scalar property $u(c)$ and/or $v(c)$ of the respective current feature descriptor $d(c)$ in the current image and the respective scalar property $u(r)$, $v(r)$ of the respective reference feature descriptor $d(r)$ for the determination of the similarity measure $D(c, r)$. For example, this may be computed from the sign of SURF (positive or negative Laplacian of Gaussian).

According to a further embodiment, the method of the invention may include determining a respective combined distance measure $D(c, r)$ for the determination of the respective similarity measure by combining at least one of the respective first, second, third and fourth distance measures with at least another of the respective first, second, third and fourth distance measures.

For example, $D(c, r)$ can be the combination of $\Delta u$, $\Delta v$, $\Delta x$, $\Delta y$, $\Delta z$, and/or $\Delta d$.

$P(c,r)$ describes another advantageous, optional part of the invention's matching process. It may be used in a check, whether two descriptors should be matched at all. Mostly, this is helpful to avoid wrong matches. P checks, if certain conditions are met, depending on given thresholds.

According to an embodiment, the method of the invention may include determining a check parameter P, which is calculated in order to determine whether a feature pair c, r with one of the current features and one of the reference features is eligible to be a valid match.

According to an embodiment, the method of the invention may include determining at least one respective check parameter $P(c, r)$ by comparing at least one of the respective second distance measure $\Delta x$ and/or $\Delta y$, third distance measure $\Delta z$ and fourth distance measure $\Delta u$, $\Delta v$ with at least one respective threshold, wherein the check parameter $P(c, r)$ is used to determine whether a feature pair c, r with one of the current features and one of the reference features is eligible to be a valid match.

For example, the method may further include weighting at least one of the properties of the respective current feature c and reference feature r, or at least one of the distance measures between one or more of the properties. Further, the method may include weighting at least one of the first, second, third and/or fourth distance measures when determining the combined distance measure $D(c, r)$.

Particularly, each of the above described components can be given a weight (such as $w_u$, $w_v$, $w_x$, etc.), which depends on the information available to the system. Information used here can be information coming from the feature extraction process or an estimation of the current feature's position in a global coordinate system or the camera coordinate system (e.g. for stereo matching taking advantage of epipolar geometry constraints). If this kind of information is not available, the respective weights in formula $D(c,r)$ can be set to zero or a value, for example depending on the information's uncertainty. If incomplete or no information about $\Delta u$, $\Delta v$, $\Delta x$, $\Delta y$, $\Delta z$ is given or available, the threshold values can be set to a very high value or be scaled, depending on uncertainty information.

According to an embodiment, the portions of the distance measure $D(c, r)$ as described above, such as $\Delta u$, $\Delta v$, $\Delta x$, $\Delta y$, $\Delta z$, and $\Delta d$, can be determined as follows:

$$\Delta u = (u(c) - u(r))^2$$

$$\Delta v = |v(c) - v(r)|$$

$$\Delta x = \sum_{i=0}^{3} (x_i(c) = x_i(r))^2$$

$$\Delta y = \sum_{i=0}^{3} (y_i(c) - y_i(r))^2$$

$$\Delta z = \sum_{i=0}^{3} z_i(c) \cdot z_i(r)$$

$$\Delta d = \sum_{i=0}^{47} |d_i(c) - d_i(r)|$$

The given length of 48 for the feature descriptor shall be understood as a possible implementation of an embodiment and shall not be understood as limiting the invention. Naturally, the length could be built longer or shorter. Similar, other or additional types of distance measures may be computed and considered.

According to embodiments of the invention, as set out in the above formulas, calculating the respective distance measures may comprise computing sum-of-differences or sum-of-square-differences for determining the respective distance measure over a respective length or dimension (i).

In case of a binary descriptor, the distance measure may also comprise computing a Hamming-Distance.

According to an embodiment, the check parameter $P(c, r)$ and the distance measure ($D(c, r)$ can be determined as follows:

$$P(c,r) = \Delta u < \theta_u \wedge \Delta v < \theta_v \wedge \Delta x < \theta_x \wedge \Delta y < \theta_y \wedge \Delta z > \theta_z$$

$$D(c,r) = w_u \cdot \Delta u + w_v \cdot \Delta v + w_x \cdot \Delta x + w_y \cdot \Delta y + w_z \cdot \Delta z + w_d \cdot \Delta d$$

For example, the fields u, v, x, y, z and d, can be integer or floating point storage units of arbitrary bit width. In one advantageous implementation of the invention, the descriptor fields $d_i$ are each one byte long.

The hardware was specifically designed to solve the whole descriptor matching problem efficiently, not just accelerating the sum of absolute differences. If only a part is optimized, little performance gain is achieved, because of cache-misses etc. Therefore, the hardware includes its own memory (in FIG. 5: SRAM 6), loading the vector of current descriptors (current descriptors have been extracted from the current image).

With respect to the above described functions or steps of calculating the respective similarity measures, distance measures, combined distance measures, check parameters, etc., as set out above, the integrated circuit according to the present invention includes a respective unit or units implemented on the integrated circuit which perform the respective functions or steps. Examples of such units are described in more detail below with reference to FIGS. 5 and 6. These examples, however, shall not be understood as limiting the invention, as the skilled person will understand that there are multiple options of implementing the described functions or steps according to the teachings of the invention in hard-wired logic or configurable logic.

According to FIGS. 5 and 7, a possible implementation of the determination of the similarity measure in a matching process according to an embodiment of the invention is shown. The similarity measure is determined on an integrated circuit 1, which may be configured in an embodiment as shown in FIG. 5. Particularly, the integrated circuit 1 includes hardwired logic or configurable logic which processes logical functions for determining the similarity measure. One embodiment of the invention runs as follows:

Via the peripheral interface 2, the host processor (not shown) accesses configuration registers 3 storing addresses, thresholds and weights (their usage is discussed later). Then it starts the operation by writing to a virtual trigger register. The external memory interface 4 reads the vector sets C (a number of current descriptor vectors c found in the current image) and R (a number of reference descriptor vectors r created based on reference images) from an external DRAM. C is completely read into the internal SRAM 6 when the operation starts, as explained above. Vectors from R are read one by one into the register 7 with content "vector r". Vectors from the SRAM 6 are then read one by one into the register 8 with content "vector c". The unit 9 "subtract, multiply, add" calculates the intermediate values u,v,x,y,z,d as discussed above. In compare unit 10, these values are compared to the thresholds ("compare, and") and weighted in unit 11 ("multiply, add"), yielding the values P(c,r) and D(c,r) as described above. In case more current descriptor vectors c have been extracted from the current image than the SRAM 6 can hold at once, the current descriptor vectors may be divided into two or more portions (c1, c2, ... cn) and may be loaded into the SRAM 6 and be processed by the integrated circuit 1 one after another.

In unit 12, it is determined whether P is true. If P is true, then D is compared to the values D1,D2 in register 13, which register 13 is updated to contain the minimum value D1 and the second smallest value D2 of the values D(c, r) determined until then, and the index c of the minimal value D1 is kept as cmin. After all vectors c from the SRAM 6 are processed, the condition D1<t*D2 is checked in unit 14. In other words, it is determined whether the ratio of Dl and D2 falls below a defined threshold t from the configuration register 3 in order to determine whether D1 is significantly smaller than D2. If the condition is true, then a new tuple [r,cmin,D1,D2] is sent to the output buffer 15. When the output buffer 15 is full, its content is written to an external memory via the external memory interface 4 and memory bus. The overall control of this process is performed by control unit 16.

FIG. 5 shows an overview of an embodiment of the components, whereas FIG. 7 shows the general workflow of the process as described above.

Figure 11:
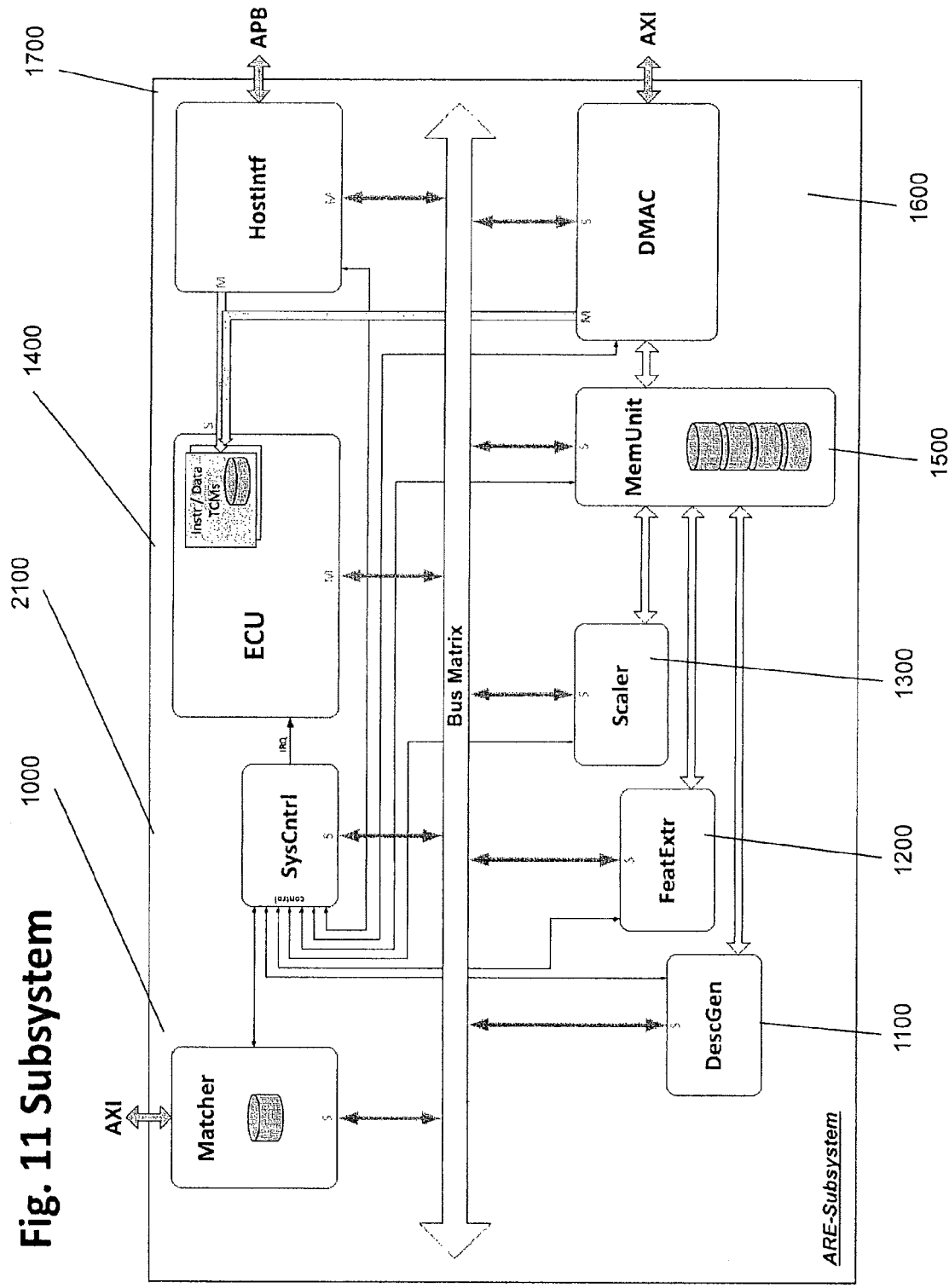
FIG. 11 shows the possible architecture of the low-power subsystem.

In addition to the matching component (FIG. 11, 1000), according to an embodiment of the invention, there can be more components that are part of the low power subsystem as shown in FIG. 11. A small CPU (1400), also called engine control unit (ECU) might control the different specialized processing units. It might also take over some algorithmic tasks, like creating descriptors of found features.

A scaling unit (1300) could generate images with scaled resolution from the original camera image or from scaled images. This can either help to reduce overall processing needs; e.g., by working on a smaller resolution image and additionally allowing the creation of scale invariant descriptors. Having multiple images, other processes could also be conducted in parallel on the different images.

Scale invariance could alternatively be achieved by having extraction and/or description algorithms, which work on different scales, e.g. by scaling the filter-size of a corner extraction process.

In an embodiment of the invention, one or more feature extraction processing units (1200) extract features from the at least one image or the images at different scales. In one embodiment of the invention, at least one descriptor generation processing unit (1100) builds descriptors, based on the features and the at least one image. According to an embodiment of the invention, the different specialized processing units (1100, 1200, 1300) are connected to a local memory unit (1500), which for example hold several buffers (e.g. of several image lines or even a complete image). Via a direct memory access controller (1600) the local memory unit (1500) can exchange data with a storage area (e.g. dynamic memory) outside the subsystem (2100), according to one embodiment. A host interface (1700), according to an embodiment, serves the purpose of allowing the application processing unit to control and configure the subsystem. This is not processing intensive for any application processing unit and can be done in high-power mode or in low-power mode at low clock rates.

The components or at least one of the components as described above and their functions (also referred to as a hardware engine in the context of the present invention) are implemented on the integrated circuit by hardwired logic or configurable logic which processes logical functions. In other words, the functions to be performed in the detection process, as described above, may be implemented directly by means of a corresponding digital electronic circuit, particularly by means of a hardwired logic or configurable logic. Such electronic circuit may be implemented in a flexible manner using an integrated circuit of the digital technology, in which a desired logical circuit may be programmed. That is, for the integration of a function according to the invention, as described above, an existing processing system, at the appropriate location, may be provided with or supplemented with at least a programmable logical circuit, such as a PLD (Programmable Logic Device) or an FPGA (Field Programmable Gated Array). Such a logical circuit may be implemented, for example, on an integrated circuit chip used, for instance, in a mobile device, such as a mobile telephone.

Figure 13:
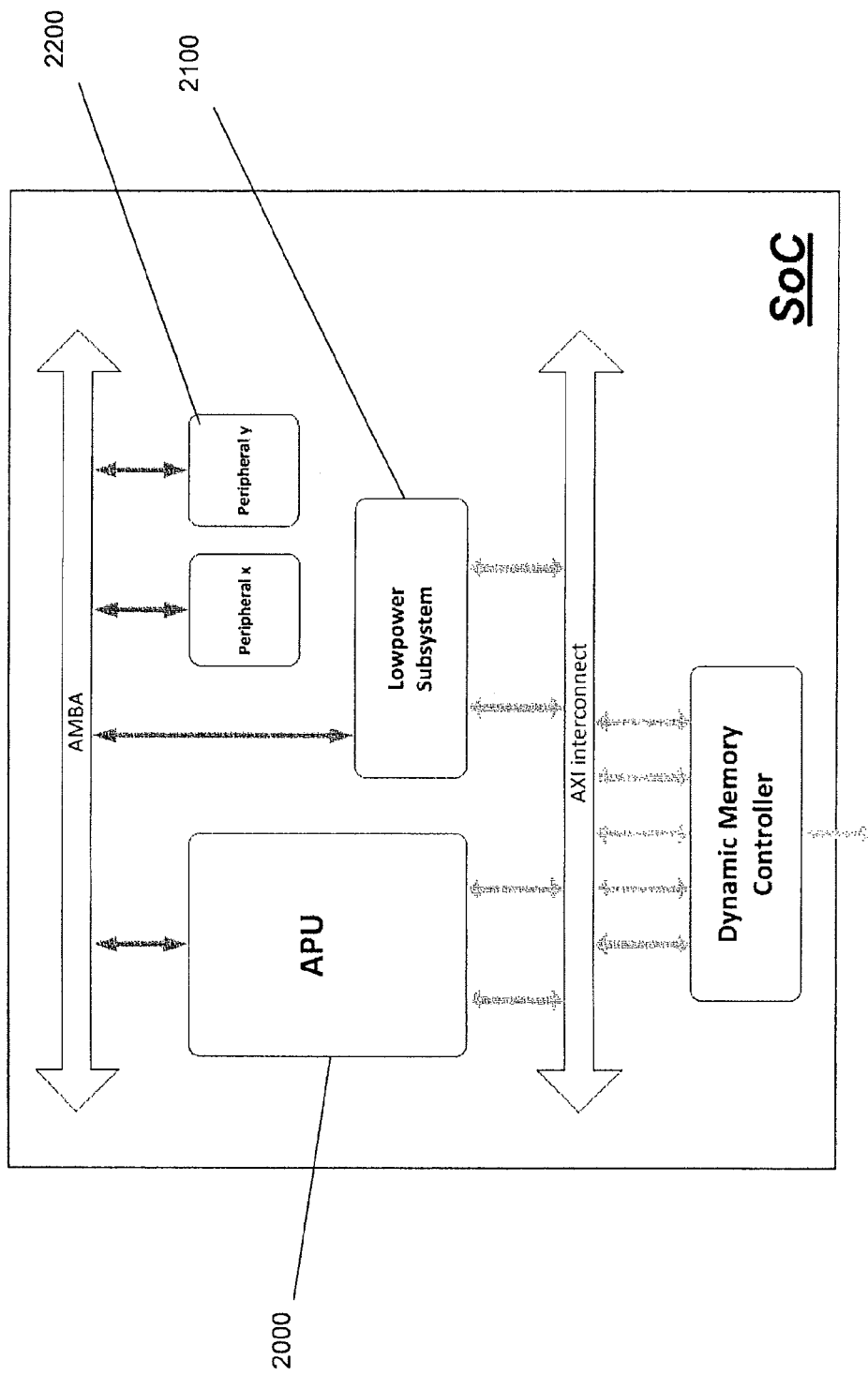
FIG. 13 shows an overview of a possible embodiment of the overall processing system.

FIG. 13 shows an overview of a possible overall processing system, according to one embodiment. The processing system could be implemented as a system on a chip (SoC). The low-power subsystem (2100) is connected via a peripheral interface bus to at least one application processing unit, also called APU (2000). An APU could for example be an ARM Cortex A9 CPU core. It is also possible, according to one embodiment, that depending on low power mode or high power mode, a different APU runs the operating system, e.g. an ARM Cortex A9 in high power mode and a ARM Cortex M in low-power mode. Another interconnect bus connects the low power subsystem to a dynamic memory controller, according to an embodiment. Via the peripheral interface bus, the APU can be connected to peripherals, e.g. a gyroscope.

Figure 6:
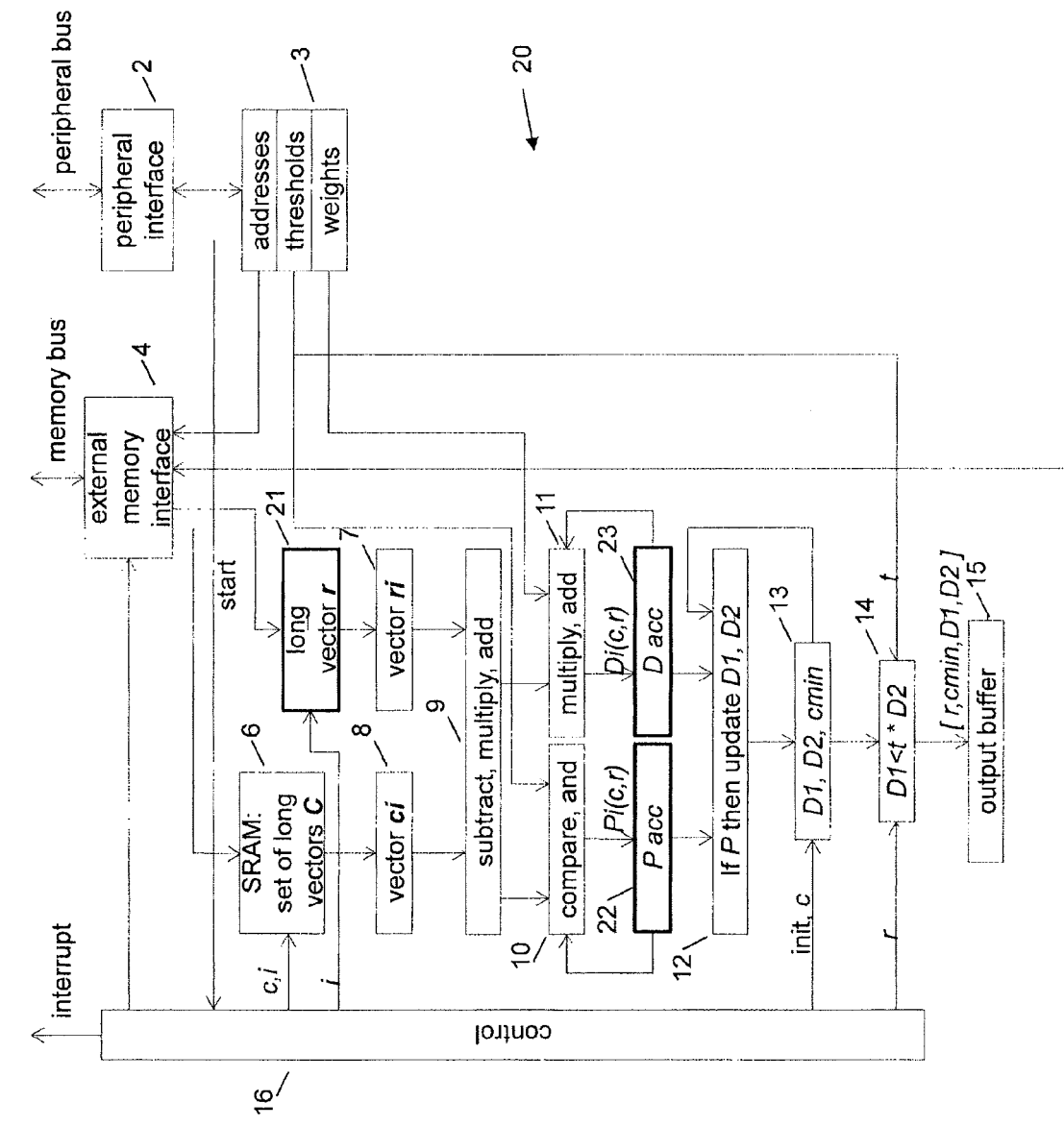
FIG. 6 depicts another possible implementation of the determination of a similarity measure in a matching process on an integrated circuit according to an embodiment of the invention.

FIG. 6 shows an embodiment of a possible implementation of the matcher (1000) on an integrated circuit 20. This embodiment was developed in order to not only handle short point-based descriptors or other short descriptors, but also longer descriptors e.g. shape-based descriptors, and it extends the above approach to work with longer vectors, e.g. 3000 byte long. As far as the same components are used as in the embodiment of FIG. 5, the respective components are designated with the same reference numbers.

In this variant of the embodiment of FIG. 5, a register bank 21 that holds a long vector r and two accumulator registers 22, 23 holding respective parameters Pacc and Dacc have been added. Only parts ci and ri of long vectors c and r are compared at once. The functions Pi(c, r) and Di(c, r) are calculated incrementally and accumulated in Pacc and Dacc. The final values P and D are then read from these registers 22, 23 before D1 and D2 are updated as before. This extension allows the comparison of much longer vectors with minimum extra hardware effort. FIG. 6 shows an overview of the extended engine's components.

Thus, according to an aspect of the invention, there is provided a register bank that holds a reference feature descriptor vector R and two accumulator registers 22, 23 for holding a respective check parameter (Pacc) and a respective distance measure (Dacc), wherein only parts (ci and ri) of a respective current feature descriptor vector C and reference feature descriptor vector R are compared at once.

Depending on the available size of the SRAM 6 or the number of different descriptors used in the overall recognition/initialization pipeline, the engine can be started several times. For example, it can first find the best matches between point based descriptors and then find the best matches for shape based descriptors, also using different thresholds and weights.

According to an embodiment of the invention, the calculations of P and D are performed fully parallel in a pipelined manner. For example, the overall throughput is one vector comparison per clock cycle: With every cycle, a new vector c is read from the SRAM 6. After the pipeline has been filled, the values of D1, D2, cmin are updated every cycle, too. The flexibility of the engine for computer vision tasks is also of advantage for finding a pose between two 3D point clouds, e.g. gathered with hardware, such as Microsoft Kinect.

Figure 8:
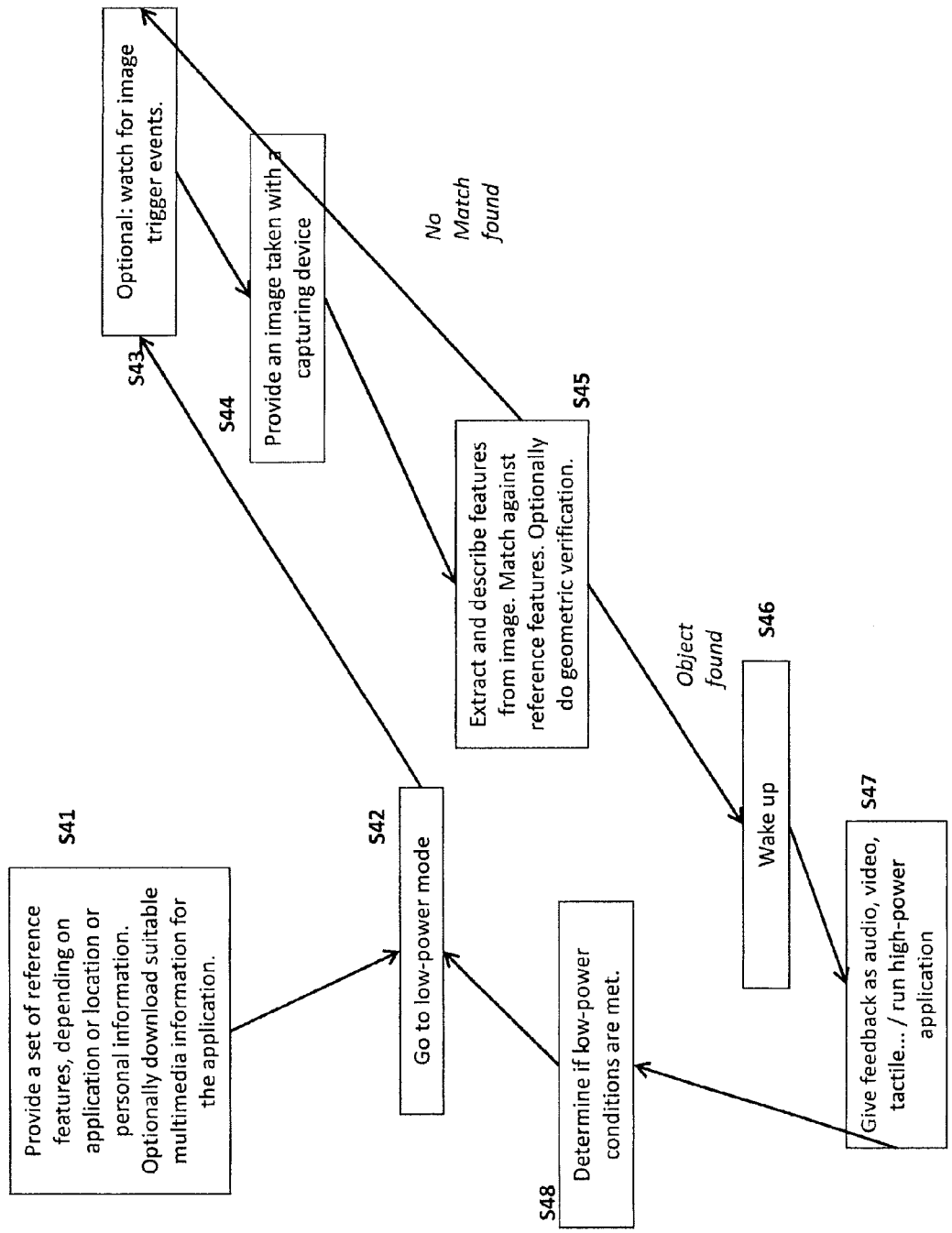
FIG. 8 describes the embodiment of a process of preparing the low-power mode, switching to low-power mode and switching to high-power mode depending on some process steps.

FIG. 8 shows an overview of the method to switch between high-power and low-power-mode. In S41 the application configures the system for its needs. In particular, reference features are provided and multimedia-data might be downloaded. The system can then move to low-power mode (s42). This can include lowering the application processing unit's clock-rate and turning off peripherals. In low power-mode, the system may watch for image trigger events (optional S43). This could be for example waiting until the device movement, according to accelerometer data, is below a certain threshold and above a second threshold, indicating the user is looking at an object, but has not put the device on a table, while drinking a coffee. If S43 is not implemented, a camera image could be taken at a certain rhythm, e.g. every 100 ms.

In s44, at least one image is taken with a capturing device (in case of a stereo-camera, two images could be taken simultaneously). In S45, the image is analyzed and tried to matched against a database of reference objects. In case certain conditions are met, geometric verification is conducted on at least one candidate object. The geometric verification can be conducted in the low-power subsystem or by the application processing unit at low clock rates, according to one embodiment. If no object was found, the system waits for another trigger event (S43) or some time to repeat the process by taking a new picture (S44). If an object has been found, the system moves to high-power-mode (wakes up) in S46. This can mean, increasing clock-rate of the main application processing unit, turning on the display and additional sensors and increasing camera frame rate (e.g. to 30 Hz), according to an embodiment. Then, a high power application can be run (S47); e.g. providing audio data about the object or calculation position and orientation of the camera and the rigidly connected display in respect to the object in order to superimpose virtual objects.

The system may determine if it should move into low-power mode in S48. This might be determined from the user's action, e.g. waving the hand in front of the camera or by speech commands. Alternatively, the system could move to low-power mode, after it has presented all relevant information about the object, e.g. played the audio file or displayed an animation sequence via augmented reality. The system could also simply move into low-power mode after a certain time, e.g. 60 seconds. This time could start counting after the initial recognition, after the object is not recognized in the camera any more or after the multimedia-data has finished playing.

Figure 12:
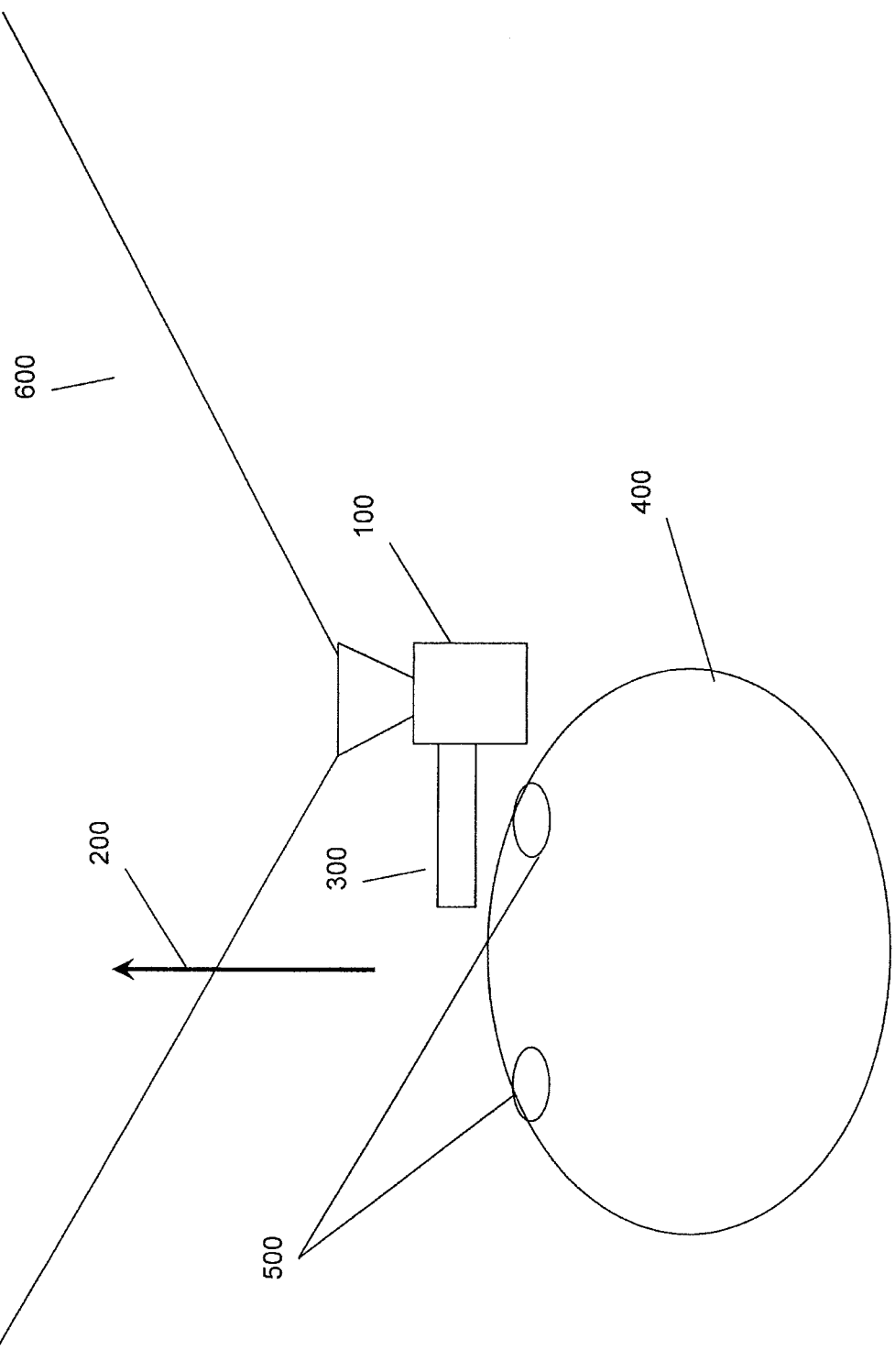
FIG. 12 shows a possible embodiment of the system.

FIG. 12 shows one possible hardware setup for an embodiment of the invention. The user wears a display (300) attached to his head (400) in front of his eyes (500). The display (300) should be rigidly attached to a camera (100) with a field of view (600). The camera is pointing roughly in the user's viewing direction (200). The SoC (FIG. 13) may be part of the camera and display unit or may be located in a device, e.g. smartphone, which is wirelessly connected to the head worn device.

Another possible hardware setup is shown in FIG. 14. The invention is especially beneficial for a scenario where a user 3100 who wears an information system 3200 equipped with a camera walks through a museum that exhibits images (as shown in FIG. 14). The wearable information system 3200 is hanging on the chest of the user 3100 and the camera of the information system points at the space in front of the user. The user starts walking through the museum, while his information system is in a low-power model. The user can now enjoy hours of walking through the museum, without worrying about his information system's battery. According to the invention, the information system is capable of scanning the user's environment for interesting objects (e.g. image 3300). This can be done while consuming little power. As soon as an image 3300 comes into the field of view of the camera, the information system can "wake up" and move to a high power mode, for example in order to download interesting content related to image 3300 and display it using Augmented Realty or in order to start an audio-clip, explaining image 3300.

Figure 9:
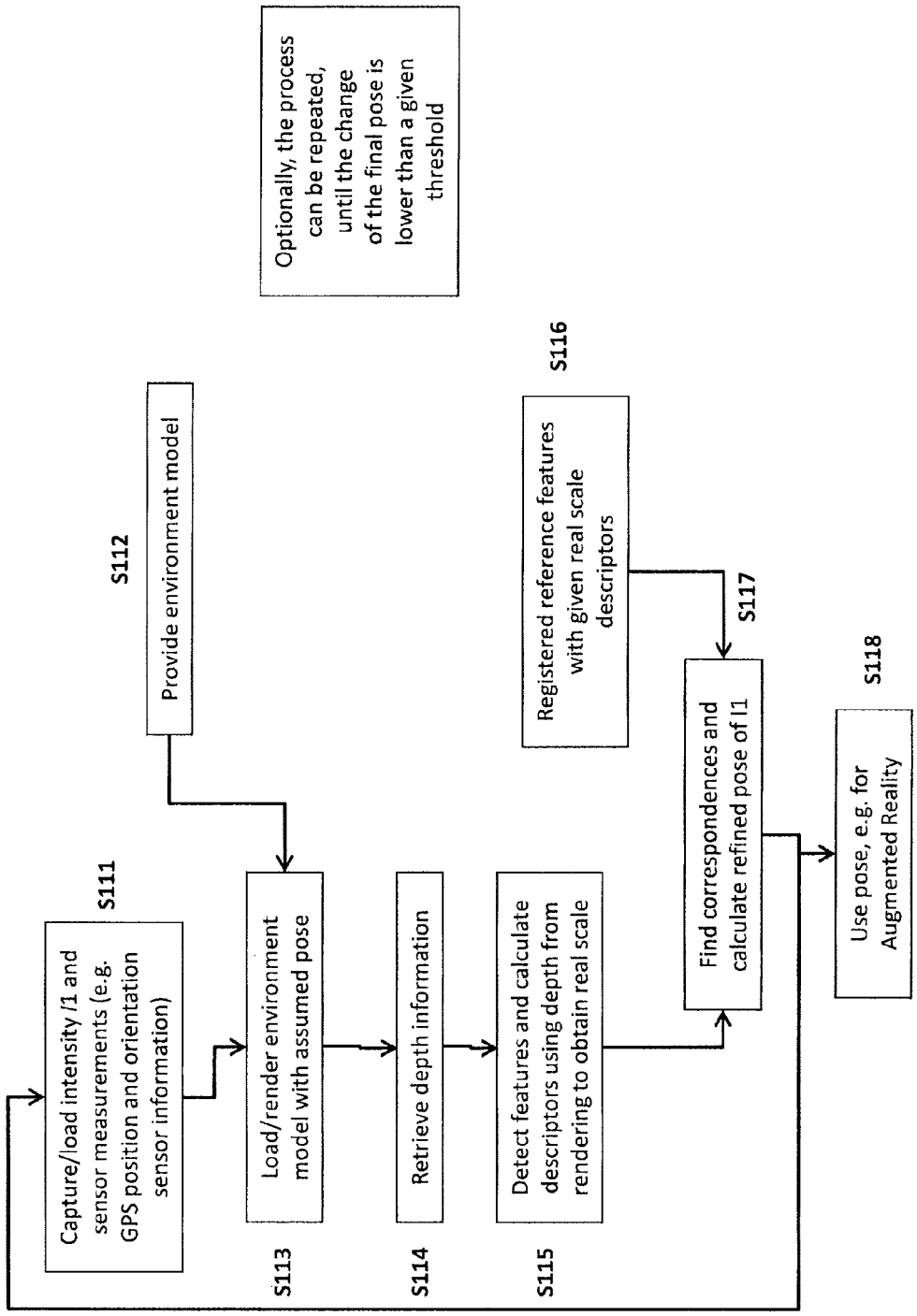
FIG. 9 shows a flow chart of a possible combination of a depth extraction mechanism with physical scale feature descriptors for the use in optical pose estimation according to an embodiment of the invention.

Applications:

FIG. 9 shows a possible use of a descriptor, relying on depth information, in order to give an example of a more complex embodiment of the invention.

According to aspects of the invention, a depth of an element, e.g. of a pixel, in an image may be used as further information when matching features. Generally, the depth of an element in an image (e.g. pixel) may be defined as referring to the distance between the physical surface that is imaged in this element (pixel) and the capturing device, particularly the optical center of the capturing device.

FIG. 9 shows a possible combination of a depth extraction mechanism with physical scale feature descriptors for the use in optical pose estimation, for example, in order to create outdoor AR experiences. In this example depth is extracted using rough sensor data and an environment model, as in FIG. 9.

In step S111, an intensity image I1 is captured by a capturing device or loaded. In addition, an initial pose of the capturing device while capturing I1 is estimated from rough sensor measurements such as GPS position and orientation sensor information. Finally, an advanced environment model including 3D data and image data (similar to Google Streetview) is provided (step S112). Image data is only necessary, if a reference model for tracking (e.g. already containing feature 3D coordinates and feature descriptors) has not been created in advance. In step S113, the environment model is loaded using the assumed camera pose provided by step S111, i.e. the environment model is rendered from the camera viewpoint of intensity image I1. In step S114, depth information is retrieved from the environment model and used in step S115 for calculating the real scale descriptors of detected features. In other words, using the depth information registered with the image I1, real scale features are extracted at a fixed scale of, for example 1 m. Because the environment model combines 3D data and image data, a reference 3D model of physical scale features with a scale of 1 m can be created (S116, this can of course be done in advance).

Using an optimization algorithm, the refined pose of I1 in the environment model's coordinate system can be calculated. The refined pose can then be used for an application, e.g. an Augmented Reality visualization of tourist data, or optionally be used to refine S111 and iterate through steps S111-S117, until the change in pose has gone below a defined quality threshold.

The found feature matches can then be used for applications including object detection, object classification, object localization, and localization of the camera in the global coordinate system.

The latter, also referred to as "self-localization", can for instance be performed by means of robust pose estimation methods such as for instance RANSAC, PROSAC or M-Estimators. Note that such methods require an estimate of the intrinsic camera parameters, in particular the focal length. Depending on the available information on the position and/or orientation of the capturing device and the depth of pixels, different possible implementations of the inventive idea arise. They differ in the spatial constraints to narrow search space or P in the matching process depending on the position and/or orientation of reference features that are potential matches for a given current feature. Exemplary examples, that we consider particularly important, will be explained in detail in the following.

Provided with a measurement of the gravity vector in a coordinate system associated to the capturing device, e.g. with inertial sensors, and the depth of a current feature in the current camera image, e.g. by means of a depth-from-stereo method, the method according to aspects of the invention computes the relative or absolute altitude of this feature.

The 2D position of a feature in the image together with intrinsic camera parameters enable defining a 3D ray in a coordinate system associated to the capturing device. As in addition the depth of the feature may be known, the feature's 3D position in the camera-aligned coordinate system can be computed. The vector from the optical center of the capturing device to the 3D feature position is then projected onto the normalized gravity vector resulting in an altitude of the feature.

The method described above results in a relative altitude measure with respect to the capturing device. To compute the absolute altitude of the feature, the device's absolute altitude needs to be added. This can be either measured, e.g. via GPS or a barometer, or can be based on an assumption as explained above.

Figure 4:
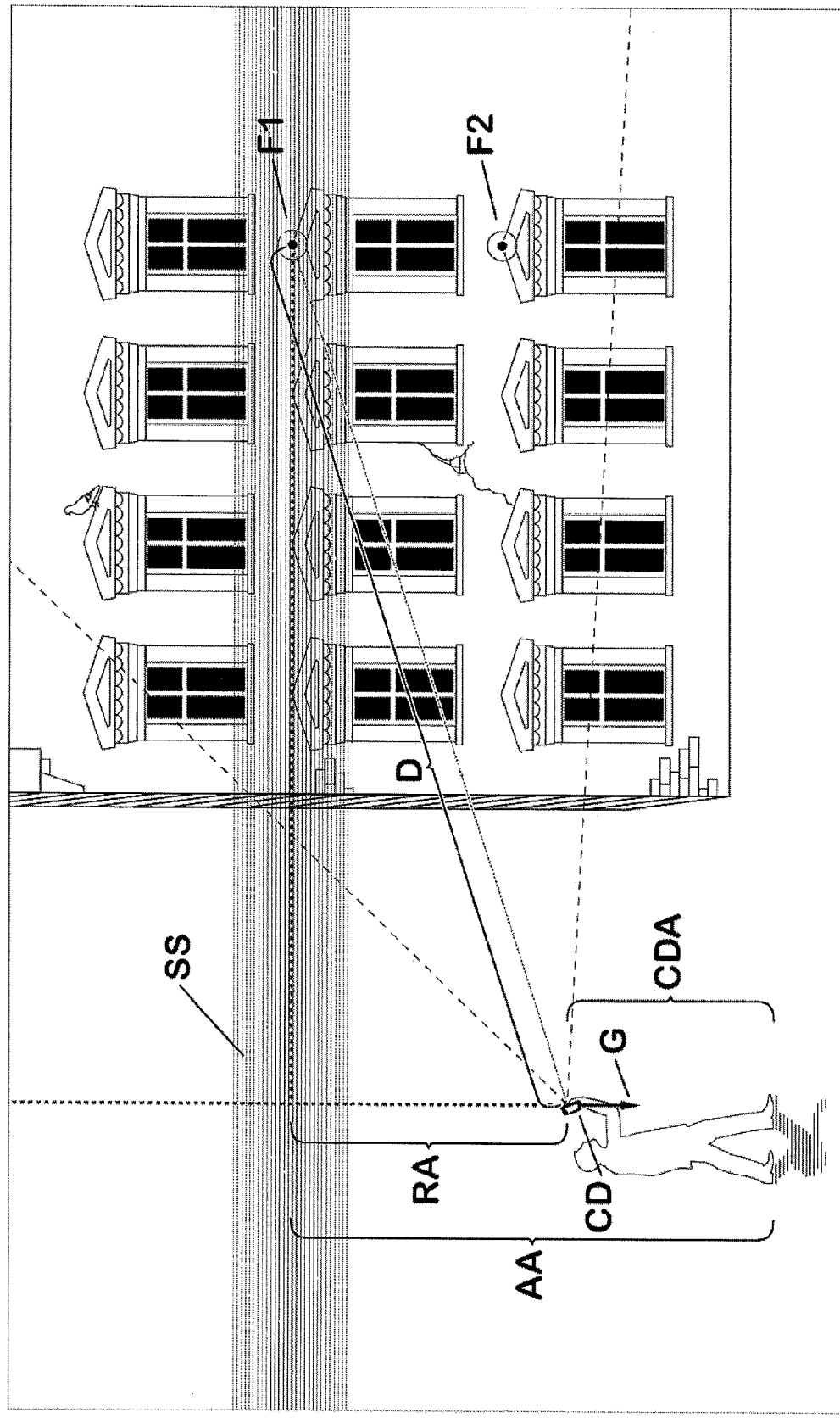
FIG. 4 shows an exemplary scene in which a method according to an embodiment of the invention is applied.

FIG. 4 illustrates a possible implementation of this aspect of the invention. Particularly, FIG. 4 shows a capturing device CD that provides a measurement of a gravity vector G in device coordinates (i.e. coordinates of the capturing device coordinate system) and the depth D of a feature F1. Given the two pieces of information, the relative altitude RA of the feature F1 with respect to the capturing device CD can be computed. Particularly, the 2D position of the feature F1 in the image together with intrinsic camera parameters enable defining a 3D ray in the coordinate system associated to the capturing device. As the depth D of the feature F1 is known, the feature's 3D position in the camera-aligned coordinate system can be computed. The vector from the optical center of the capturing device CD to the 3D feature position of feature F1 is then projected onto the normalized gravity vector resulting in the relative altitude RA of the feature F1. Adding the (absolute) altitude CDA of the capturing device CD results in the absolute altitude AA of the feature F1. Analogous calculations can be made for feature F2 to calculate its altitude.

The search space SS for a reference feature corresponding to the current feature F1 is then defined around its altitude AA. Note that in this way, the reference feature F2 is not considered as a possible match, even though it looks very similar to F1, because it does not fall into the search space SS. The search space can of course be controlled through the calculation of P in the proposed hardware engine. Thereby, the invention according to this aspect reduces the probability of mismatches.

According to one aspect of the invention, a very large set of reference features (e.g. billions or millions) is first reduced by a software approach (e.g. using GPS data as input) to a smaller set (e.g. thousands or hundred thousands), which are then matched using the hardware engine.

Although various embodiments are described herein with reference to certain components or devices, any other configuration of components or devices, as described herein or evident to the skilled person, can also be used when implementing any of these embodiments. Any of the devices or components as described herein may be or may comprise a respective processing device (not explicitly shown), such as a microprocessor, for performing some or more of the tasks as described herein. One or more of the processing tasks may be processed by one or more of the components or their processing devices which are communicating with each other, e.g. by a respective point to point communication or via a network, e.g. via a server computer.

What is claimed is:

1. A wearable information system having at least one camera, the information system operable to have a low-power mode and a high power mode, wherein the information system is configured such that the high-power mode is activated in response to an identification of a match between a reference object and at least one object in at least one field of view of the at least one camera, wherein high-power mode is not activated in response to identifying that the information system was previously set to the low-power mode from the high-power mode while the at least one object was in the field of view of the at least one camera.

2. The information system according to claim 1, the system comprising a head-worn display and at least one camera attached to the display being configured to receive information in a same viewing direction as the head worn display.

3. The information system according to claim 1, wherein the camera is able to record at least one selected from a group consisting of intensity information, color information, and depth information.

4. The information system according to claim 1, wherein in the low power mode a clock rate of at least one application processing unit of the information system is lower than in the high-power mode.

5. The information system according to claim 1, wherein in the low power mode the system includes at least one peripheral submodule that can be disconnected from a power supply.

6. The information system according to claim 1, wherein the system comprises at least one application processing unit and additional processing units, wherein identification of the match is conducted by the additional processing units.

7. The information system according to claim 6, wherein the additional processing units contain at least one selected from a group consisting of a CPU, a hardwired logic for matching features, at least one hardwired logic for extracting features from an image, at least one hardwired logic for describing features extracted from an image, at least one scaling unit for generating 30 different resolution images of a camera image, a storage for storing current features found in an image, and a storage for storing a database of reference features.

8. The information system according to claim 1, wherein the object is non-human.

9. The information system according to claim 1, wherein the match between the reference object and at least one object in the at least one field of view of the at least one camera is identified by:
   extracting features from an image captured by the camera,
   building a higher level description of the features, and
   matching the features against previously stored higher level descriptions of features from previously learned objects.

10. The information system according to claim 9, wherein the features are point-features.

11. The information system according to claim 9, where the higher level descriptors are rotation invariant.

12. The information system according to claim 9, where the higher level descriptors are obtained by performing feature extraction and feature description on different scaled versions of the captured image.

13. The information system according to claim 1, wherein the system is configured such that an image is recorded in response to a trigger from a motion sensor.

14. The information system according to claim 1, wherein the system can be put to low-power mode by a user.

15. The information system according to claim 14, wherein the low power-mode is activated via gesture recognition.

16. The information system according to claim 14, wherein the low-power mode is activated using a voice command.

17. The information system according to claim 1, wherein in the high-power mode, the system displays augmented reality information related to the at least one object.

18. The information system according to claim 1, wherein the low-power mode is automatically activated when the at least one object is not being detected.

19. The information system according to claim 9, wherein new description features are downloaded from a remote server based on sensor measurements.

* * * * *